United States Patent [19]

Linton et al.

[11] Patent Number: 4,570,113
[45] Date of Patent: Feb. 11, 1986

[54] ROTARY MEMBER CONTROL

[75] Inventors: Steven C. Linton, Waynesville; Edgar E. Moellering, Dayton, both of Ohio

[73] Assignee: Monarch Marking Systems, Inc., Dayton, Ohio

[21] Appl. No.: 611,822

[22] Filed: May 18, 1984

[51] Int. Cl.[4] .............................................. G05B 5/01
[52] U.S. Cl. .................................... 318/612; 318/618; 318/601
[58] Field of Search ............... 318/612, 618, 601, 602, 318/362, 696, 685

[56] References Cited

U.S. PATENT DOCUMENTS 3,573,589 4/1971 Berry .................................. 318/601
4,331,910 5/1982 Kohzai et al. ....................... 318/618

Primary Examiner—William M. Shoop, Jr.
Assistant Examiner—Saul M. Bergmann
Attorney, Agent, or Firm—Mason, Kolehmainen, Rathburn & Wyss

[57] ABSTRACT

A method and apparatus for controlling the position of a rotary member, particularly a rotary knife, utilizes a motor that is continuously coupled to the rotary member. A shaft position sensor and velocity sensor cooperate with motor control and drive circuitry to energize and brake the motor in accordance with the position and velocity of the motor drive shaft to provide a single cutting cycle each time a cut is required.

36 Claims, 7 Drawing Figures

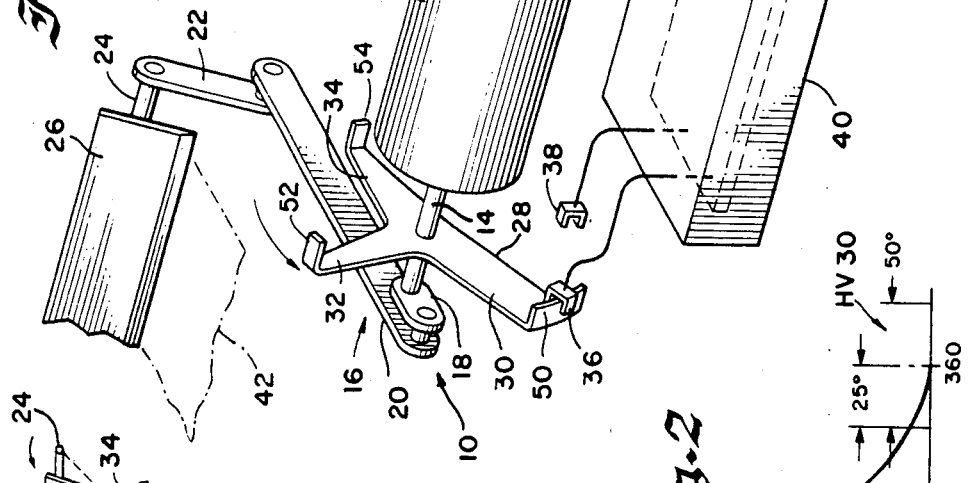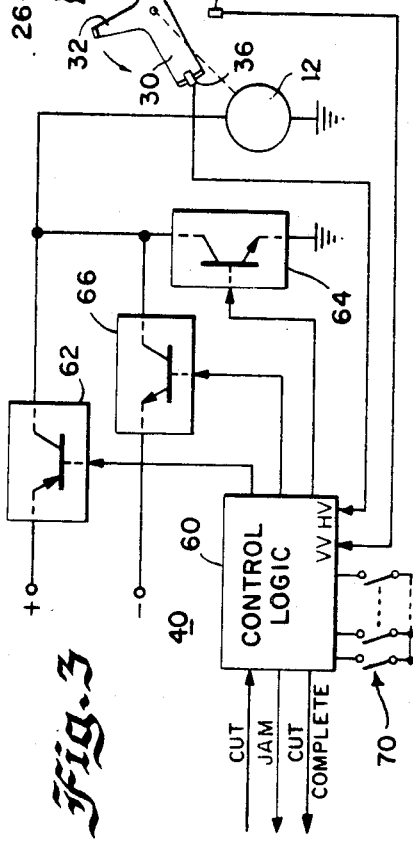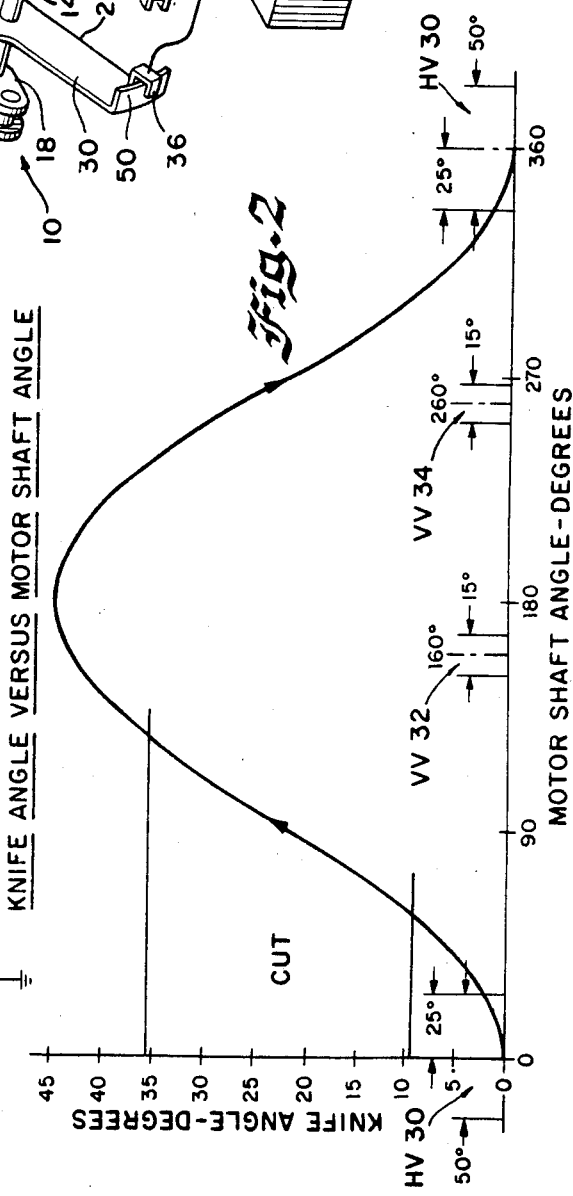

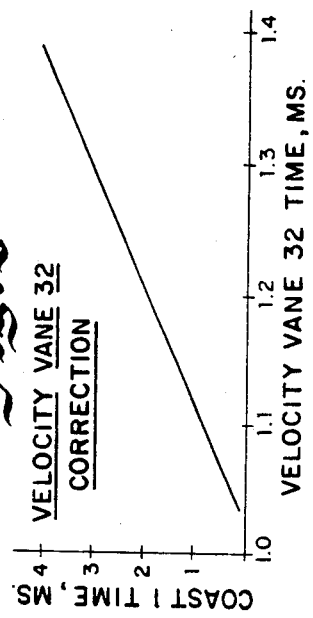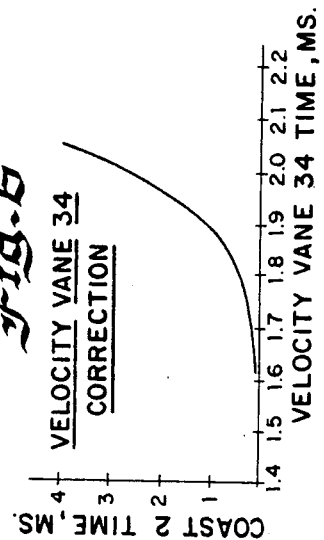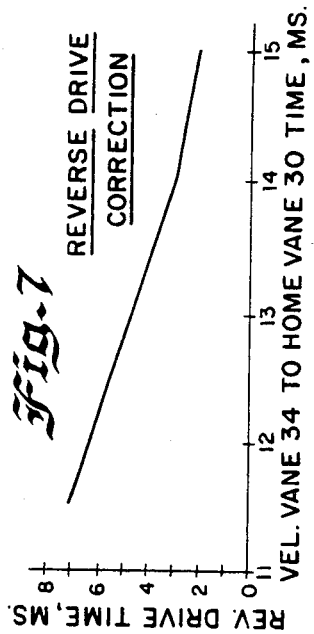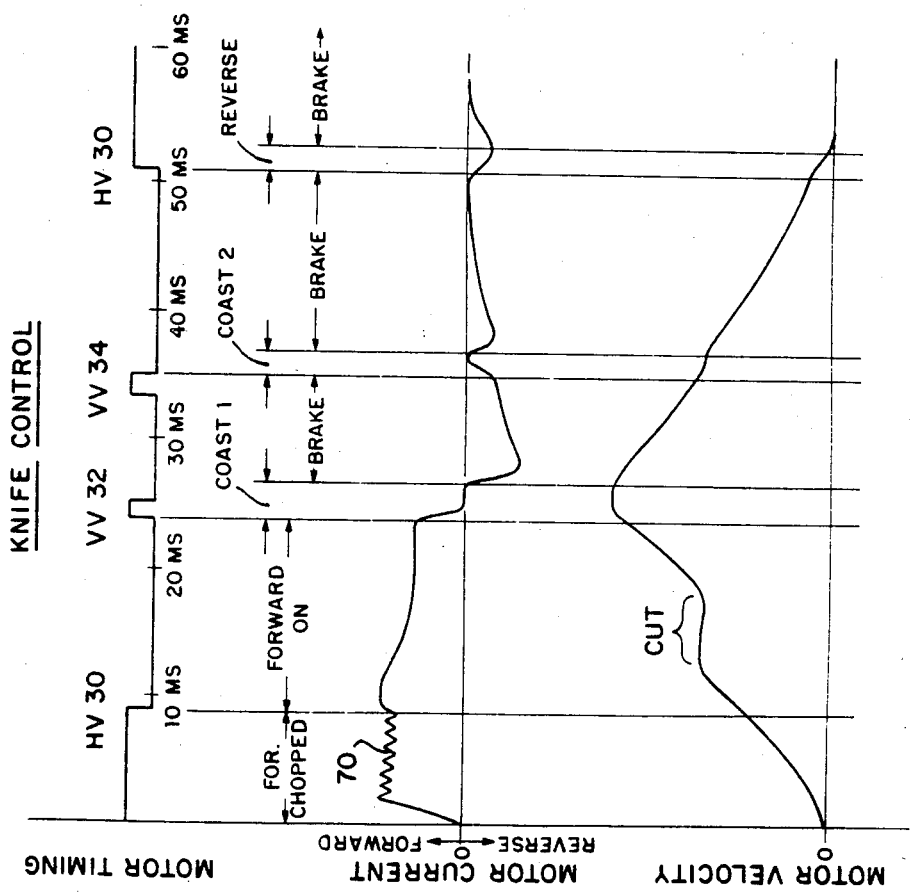

ROTARY MEMBER CONTROL

BACKGROUND OF THE INVENTION

1. Field of the Invention

This invention relates generally to motor control circuits, and more particularly to motor control circuits suitable for driving apparatus, such as, for example, rotary knives, in cyclical operations.

2. Prior Art

Various drive mechanisms for driving apparatus such as rotary knives and other apparatus are known. Among such systems are systems that utilize electrically or mechanically operated clutches that couple the device to be driven to a motor until the operating cycle of the device is completed, and then disengage the device from the motor, leaving the motor free running. In other systems, one or more solenoids are coupled to the device to be actuated and sequentially energized to provide the operating cycle. Still other systems utilize position sensing circuitry and speed sensing tachometers in conjunction with control circuitry responsive to the speed and position sensing circuitry to selectively apply energizing and braking voltage to the drive motor to provide the desired cyclical action. One such system is disclosed in U.S. Pat. No. 3,508,133.

While the above described prior art systems do provide a way to control the operation of a cyclically operating device, the systems employing clutches are prone to clutch wear and tend to put undue stress on the driving motor when the motor is engaged and disengaged. The systems employing solenoids tend to be complex and noisy in operation, and require a high peak current capability to operate the solenoids. Systems like the one disclosed in the aforesaid U.S. Pat. No. 3,508,133 do provide a relatively accurate way to control the position of a cyclically operating device, but such systems still require mechanical braking and clutches in order to operate properly.

SUMMARY OF THE INVENTION

Accordingly, it is an object of the present invention to provide an improved control system for controlling cyclically operated devices that overcome many of the disadvantages of the prior art systems.

It is another object of the present invention to provide a motor control circuit particularly suitable for controlling rotary knives.

It is yet another object of the present invention to provide a drive system for cyclically operating devices that is uncomplicated and has a long operating life.

It is still another object of the invention to provide a drive system for a cyclically operating device that is not excessively noisy in operation.

It is still another object of the invention to provide a drive system for a cyclically operating device that does not draw excessive current during any portion of its operating cycle.

It is still another object of the invention to provide a driving system for a rotary knife that has a rapid cycle time.

It is still another object of the invention to provide a driving system for a rotary knife that provides an indication when a cut is completed, thereby making it possible to determine when a jam has occurred in the system.

It is still another object of the invention to provide a drive system for a cyclically operating device that accurately positions the device at the beginning and end of each operating cycle.

Briefly, in accordance with a preferred embodiment of the invention, there is provided an electric motor, preferably a permanent magnet direct current motor, that is connected by a linkage to the device to be cyclically driven, for example, a rotary knife in the present embodiment. The linkage is constructed to rotate the knife by an angle of, for example, 45° from a home position to a cutting position during the cutting operation, and then to return the knife to the home position. Such a cutting operation occurs for each 360° revolution of the drive shaft of the DC motor.

A home position indicating vane and two velocity vanes are mechancially coupled to the drive shaft of the motor, and cooperate with a home vane sensor and a velocity vane sensor to provide signals representative of the position and speed of the drive shaft. The speed and position representative signals are applied to a motor control circuit that selectively energizes the motor in the forward direction, permits the motor to coast, dynamically brakes the motor or applies a reverse voltage to the motor accurately to control the speed of the motor during the cutting cycle, and to return the knife to its initial position after each cutting cycle.

DESCRIPTION OF THE DRAWING

These and other objects and advantages of the present invention will become readily apparent upon consideration of the following detailed description and attached drawing wherein:

FIG. 1 is a simplified perspective view of the system according to the invention;

FIG. 2 is a graph illustrating the angular relationship between the knife and the drive shaft of the motor illustrated in FIG. 1;

FIG. 3 is a simplified block diagram of the control and drive circuitry used to drive the motor of FIG. 1; and FIGS. 4–7 are graphs illustrating the control signal corrections applied to the motor as a function of the velocity of the motor shaft.

DETAILED DESCRIPTION OF THE PREFERRED EMBODIMENT

Referring now to the drawing, with particular attention to FIG. 1, there is shown a driving and control system according to the invention, generally designated by the reference numeral 10. The system 10 includes a drive motor 12, preferably a permanent magnet direct current motor; however, other motors that can be dynamically braked and electrically reversed may also be used. The motor 12 has a drive shaft 14 that is coupled to a linkage 16 having arms 18, 20 and 22 that mechanically couple the drive shaft 14 to a rotary shaft 24 coupled to a knife blade 26. Also coupled to the drive shaft 14 is a position sensing device 28 that has a home vane 30 and a pair of velocity vanes 32 and 34 extending radially therefrom. A home vane sensor 36 and a velocity vane sensor 38 sense the proximity of the home vane 30 and velocity vanes 32 and 34, respectively. A drive and control circuit 40 selectively energizes, deenergizes or reverse energizes the motor 12 in response to signals indicating the initiation of a cutting operation, and in response to signals from the home vane sensor 36 and the velocity vane sensor 38.

The linkage 16 is designed to convert rotary motion from the drive shaft 14 to cyclical motion of the knife blade 26. For example, for each 360° of the motor shaft 14, the knife blade 26 is rotated, for example, 45° counterclockwise from the position shown in FIG. 1 and returned to that position. During this cycle, the knife 26 operates to cut a web 42, which may be, for example, a stiff paper web suitable for cutting into tags, or other material.

The operation of the blade 26 must be accurately controlled by the drive mechanism in order to move the blade from its home position through a cutting cycle and back to the home position without the use of a detent or other position locating mechanisms. This means that the speed and position of the shaft 14 must also be accurately controlled. Such control is provided by the home vane 30 and the velocity vanes 32 and 34 which cooperate with the home vane sensor 36, the velocity vane sensor 38 and the control and drive circuitry 40. The home vane 30 and the home vane sensor 36 provide an indication of the home position of the shaft 14 so that the shaft 14 is always returned to a position such that the knife blade 26 is positioned to initiate the next cutting cycle after each cutting cycle is completed. Thus, the home vane 30 defines the beginning and end of each cutting cycle. The velocity vanes 32 and 34, as well as the velocity vane sensor 38, monitor the speed of the shaft 14 during the cutting cycle and cooperate with the control and drive circuitry 40 to apply energizing or braking signals as required to maintain the speed of the shaft 14 within a speed range that allows the shaft 14 to be brought to a stop at its home position at the end of each cutting cycle without excessive undershoot or overshoot.

The relationships between the motor shaft angle and the knife angle is illustrated in FIG. 2. As is illustrated in FIG. 2, the origin is defined as the home position for both the knife and the motor shaft, and corresponds to the home vane 30 being centered on the home position sensor 36. Upon initiation of a cutting cycle, the motor is energized and begins to rotate the knife blade 26 toward the web. After the knife 26 has been rotated a predetermined amount, for example, approximately 10°, it contacts the web and the cutting operation begins. During the cutting operation, the rotation of the knife blade 26 continues until the cutting operation is completed after, for example, approximately 36° of rotation of the knife 26. The knife continues to rotate until it is rotated, for example, approximately 45°, at which point the knife blade 26 is returned to its home position. The motor shaft 14 has rotated 360° and is also in its home position at this point.

As previously discussed, in order to assure that the motor shaft 14 and the knife blade 26 are returned to their home positions at the end of each cutting cycle, the home vane 30 and the velocity vanes 32 and 34 are sensed as they pass in proximity to the home vane sensor 36 and the velocity vane sensor 38 (FIG. 1), respectively. Because the vanes 30, 32 and 34 must provide both position and speed information, they are provided with faces having a predetermined width so that velocity may be determined by the length of time that the face is in proximity to one of the sensors. In the embodiment illustrated in FIG. 1, the vanes 30, 32 and 34 are provided with faces 50, 52 and 54, respectively. The faces 50, 52 and 54 are designed so that they remain in proximity to one of the sensors 36 and 38 for a predetermined number of degrees of rotation of the shaft 14. For example, the face 50 of the home vane 30 remains in proximity to the home vane sensor 36 for approximately 50° of rotation of the shaft 14, although other values may be used. Similarly, each of the faces 52 and 54 of the velocity vanes 32 and 34, respectively, remains in proximity to the velocity vane sensor 38, for example, approximately 15° of rotation of the shaft 14.

The relative position of each of the faces 50, 52 and 54 with their respective sensors 36 and 38 as a function of the rotation of the shaft 14 is illustrated in FIG. 2. As is illustrated in FIG. 2, the face 50 of the home vane 30 is centered over the home position sensor 36 when the shaft 14 is in the home position, as is illustrated by the legend HV 30 at the home position at zero degrees and at 360° of rotation of the shaft 14 (FIG. 2). Similarly, the face 52 of the velocity vane 32 is centered about the velocity vane sensor 38, as is illustrated by the legend VV 32. Similarly, the face 54 of the velocity vane 34 is centered about the velocity vane sensor 38 at approximately 260° of travel of the shaft 14, as is illustrated by the legend VV 34. The width and angular positions of the faces of the various vanes 30, 32 and 34 serve to control the braking operation of the motor 12 following each cutting operation.

The interaction between the vanes and sensors and the control and drive circuitry 40 is illustrated schematically in FIG. 3. In the circuit illustrated in FIG. 3, the control and drive circuitry 40 includes a control logic circuit 60 which may include a microprocessor, such as, for example, an MC6805 manufactured by Motorola, and three drive circuits 62, 64 and 66 which provide energizing, braking and reverse energizing signals, respectively, to the motor 12. The drive circuits 62, 64 and 66 may be conventional drive circuits employing, for example, series pass transistors to regulate the flow of current through the motor 12. In the circuit illustrated in FIG. 3, the circuit 62 applies an energizing voltage to the motor 12 to drive the motor 12 in a forward direction. The drive circuit 64 selectively shunts the armature windings of the motor 12 to provide a dynamic braking action, and the drive circuit 66 applies a reverse polarity voltage to the motor 12 to drive the motor 12 in the reverse direction. The drive circuits 62, 64 and 66 are selectively energized to apply a forward energizing voltage, a dynamic braking action, or a reverse energizing voltage to the motor 12 in response to the various signals received from the sensors 36 and 38.

Whenever a cut signal, indicating that a cut should be initiated, is applied to the control logic 40, the control logic 60 renders the forward drive circuit 62 operative to apply a forward drive current to the motor 12. Because the armature winding of a motor whose armature is not rotating, or is rotating at a low rate of speed, tends to draw high current, the magnitude of the current applied to the armature of the motor 12 is limited to a safe value, for example, by a switching regulator within the control logic 60 or the drive circuit 62. Such switching action is illustrated by the sawtooth waveform 70 (FIG. 4) of the current applied to the motor 12. The current limited waveform is applied to the motor 12 until the home vane 30 is no longer detected by the home vane sensor 36. This typically occurs in approximately 9 milliseconds, and is illustrated by the trailing edge of the HV signal in the top graph of FIG. 4. When this occurs, continuous current is applied to the motor 12 by the drive circuit 62. Because the armature of the motor 12 is now generating a back EMF, the current limiting regulation is no longer required, and it is desirable to provide full current to the motor 12 during the cutting cycle.

The application of full current is continued until the leading edge of the velocity vane 32 (VV 32 in FIG. 4) is detected. At this point, the drive circuit 62 is deenergized, and the motor 12 is allowed to coast for a predetermined length of time determined by the velocity at which the velocity vane 32 passed the sensor 38. After the predetermined coasting period has passed, the control logic 60 energizes the dynamic braking circuit 64 which shunts the motor 12 until the trailing edge of the velocity vane 34 is detected by the velocity vane detector 38 (VV 34, FIG. 4). During the shunting of the motor 12 by the braking circuit 64, the back EMF generated by the armature of the motor 12 results in a reverse current flowing through the armature of the motor 12 which tends dynamically to brake the motor shaft 14, as is illustrated by the bottom graph of FIG. 4.

After the trailing edge of the velocity vane 34 is detected, the dynamic braking circuit 64 is deenergized to allow the motor 12 to coast for a length of time determined by the velocity with which the velocity vane 34 passed the sensor 38. After the coasting time interval has elapsed, the brake circuit 64 is again energized to again shunt the motor 12 in order to provide further dynamic braking. The dynamic braking is continued until the leading edge of the home vane 30 is sensed by the home vane sensor 36. At this point, the reverse drive circuit 66 is energized by the control logic 60 to provide a reverse voltage (or current) to the motor 12 to retard the rotation of the shaft 14 even more rapidly. The time that the reverse voltage is applied is determined by the time interval between the detection of the trailing edge of the velocity vane 34 and the leading edge of the home vane 30. Because the aforementioned time interval is inversely proportional to the speed of the motor shaft 14, the shorter the time interval between the detection of the velocity vane and the home vane, the longer the reverse current must be applied to assure that the shaft 14 is brought to a complete stop. After the reverse voltage is removed from the motor 12, the motor 12 is again shunted by the brake circuit 64 to bring the armature of the motor 12 to a complete stop, and to resist movement of the armature by mechanical or electrical forces.

If desired, a jam detection circuit may be used to detect the occurrence of a jam or other condition that causes the cutting mechanism to cycle more slowly than normal. Such a jam detection circuit may utilize a time out circuit or a clock within the logic circuit 60 to determine the time interval between the initiation of the cutting cycle and the detection of the home vane 30 (or other vane). If the time is excessive, for example two times or more the time required under normal operating conditions, a jam condition will be indicated, for example, on the "JAM" line from the control logic 60.

As was stated in the discussion of FIG. 4, the amount of time that the motor 12 is allowed to coast is determined by the length of the time required for the velocity vane 32 to pass through the velocity vane sensor 38. This relationship is illustrated in FIG. 5. As is apparent from FIG. 5, the greater the time required for the velocity vane 32 to pass through the velocity vane sensor 38, the longer the motor 12 is permitted to coast before additional braking is applied.

The criteria for determining the coast time following the detection of the velocity vane 34 is illustrated in FIG. 6. As in the case of FIG. 5, the coast time is directly proportional to the time required for the velocity vane 34 to pass through the sensor 38. However, because the shaft 14 is approaching the home position, the function defining the coast time versus the velocity vane time is made non-linear to assure enough braking to stop the shaft 14 before tne home position is reached.

Similarly, the relationship between the reverse drive time and the time interval between the detection of the velocity vane 34 and the home vane is illustrated in FIG. 7. Because the vane-to-vane detection time is an inverse function of speed, tne graph illustrated in FIG. 7 is also an inverse function, i.e., the greater the speed, the greater the reverse drive time required to stop the rotation of the shaft 14.

In the present embodiment, the curves of FIGS. 5, 6 and 7 were determined empirically, and may readily be stored in a look-up table within the control logic 60; however, other curves can be used, the curves can either be stored in a look-up table or mathematically generated. In addition, the control can also be made adaptive to compensate for various environmental and other factors. For example, as the temperature of the motor increases, it tends to slow down less rapidly. Thus, in order to compensate for such variations, the temperature of the motor may be sensed with a varistor or the like, and the correction factors may be adjusted as a function of temperature. In addition, manually operable switches, such as, for example, a plurality of switches 70, may be provided so that the correction curves may be adjusted manually to compensate for manufacturing tolerances, wear and other factors. The switches 70 may be used to enter a predetermined number representative of the required correction factor into the control logic 60 to thereby cause the control logic 60 to alter the drive, coast or brake times to components for the various factors mentioned above. For example, the reverse drive correction function illustrated in FIG. 7 may be shifted up or down as required to assure that the knife blade 26 stops in the home position. Also, adjustments to the other tables may be made to control the velocity of the blade during the cutting operation.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for controlling the position of a rotary member, comprising:
   a drive motor having a drive shaft;
   means mechanically coupling said drive shaft to said rotary member;
   means responsive to the rotation of said drive shaft for providing signals representative of the position and velocity thereof; and
   control mean responsive to said position and velocity signal providing means for selectively energizing, braking and reversing said motor in response thereto for controlling the position and velocity of said shaft, wherein said position and velocity signal providing means includes a plurality of vanes coupled to said shaft and means for sensing the proximity of said vanes.

2. Apparatus as recited in claim 1 wherein said sensing means is responsive to the time required for one of said vanes to pass thereby for providing a signal representative of the speed of said shaft.

3. Apparatus as recited in claim 2 wherein said motor is a direct current motor.

4. Apparatus as recited in claim 3 wherein said direct current motor is a permanent magnet direct current motor.

5. Apparatus as recited in claim 1 wherein said sensing means is responsive to the time interval between the detection of successive vanes for providing a signal representative of the speed of said shaft.

6. Apparatus as recited in claim 1 wherein said sensing means is responsive to the position of one of said vanes for providing a signal representative of the position of said shaft.

7. Apparatus as recited in claim 1 wherein said sensing means includes first and second sensors, and position and velocity vanes, wherein said first sensor is responsive to said position vane for determining the position of said shaft, and said second sensor is responsive to a dimension of said velocity vanes for providing a signal representative of the velocity of said shaft.

8. Apparatus as recited in claim 7 wherein said sensing means is further responsive to the time interval between the sensing of one of said velocity vanes and said position vane for applying a braking voltage to said motor.

9. Apparatus as recited in claim 1 wherein said motor includes an armature, and said control means includes means for selectively shunting said armature to provide dynamic braking and means for applying forward and reverse voltage for energizing and reversing said motor, respectively.

10. Apparatus for controlling the operation of a knife comprising:
   an electric motor having a rotary drive shaft;
   means coupling said drive shaft to said knife, said coupling means being operative to operate said knife one complete cutting cycle upon the rotation of said drive shaft by a predetermined number of revolutions; and
   control means for energizing said motor for a single cutting cycle, said control means being responsive to the speed and position of said drive shaft for applying energizing and braking signals to said motor to initiate the cutting cycle and to terminate the rotation of said shaft immediately upon the completion of said cutting cycle.

11. Apparatus as recited in claim 10 further including a plurality of vanes coupled to said drive shaft for movement therewith, wherein said control means is responsive to the position and velocity of said vanes.

12. Apparatus as recited in claim 11 wherein said vanes include a home vane and a velocity vane, said control means being responsive to the position of said home vane for providing a signal representative of the position of the drive shaft corresponding to the beginning of a cutting cycle.

13. Apparatus as recited in claim 12 wherein said predetermined number of revolutions is one.

14. Apparatus as recited in claim 12 wherein said control means is responsive to the velocity of said velocity vane for providing a signal representative of velocity.

15. Apparatus as recited in claim 14 wherein said control means is responsive to a predetermined dimension of said velocity vane for providing said velocity representative signal.

16. Apparatus as recited in claim 14 wherein said control means is responsive to the time interval between the detection of said velocity vane and another vane for providing said velocity representative signal.

17. Apparatus as recited in claim 16 wherein said other vane is the home vane.

18. Apparatus as recited in claim 14 further including a second velocity vane.

19. Apparatus as recited in claim 12 wherein said control means includes means for sensing the position of said home vane for providing said signal representative of the position of the drive shaft corresponding to the beginning of a cutting cycle.

20. Apparatus as recited in claim 10 wherein said motor includes an armature, and said control means includes means for selectively shunting said armature to provide dynamic braking and means for applying forward and reverse voltage for energizing and reversing said motor, respectively.

21. Apparatus for controlling the operation of a cutting member, comprising;
   a drive motor having a drive shaft;
   means mechanically coupling said drive shaft to said cutting member, said coupling means including means for operating said cutting member through a cutting cycle;
   means for providing a signal representative of the progress of the cutting cycle; and
   control means responsive to said progress signal providing means for selectively energizing, braking and reversing said motor in response thereto for rendering said motor to operate said cutting member through a cutting cycle.

22. Apparatus as recited in claim 21 wherein said progress signal providing means includes means for providing a signal representative of the beginning of a cycle.

23. Apparatus as recited in claim 22 wherein said progress signal providing means includes means for providing a signal representative of the velocity of the cycle.

24. Apparatus as recited in claim 23 wherein said beginning of cycle and velocity signal providing means includes a plurality of vanes coupled to said shaft and means for sensing the proximity of said vanes.

25. Apparatus as recited in claim 24 wherein said sensing means is responsive to the time required for one of said vanes to pass thereby for providing a signal representative of the speed of said shaft.

26. Apparatus as recited in claim 24 wherein said sensing means is responsive to the time interval between the detection of successive vanes for providing a signal representative of the speed of said shaft.

27. Apparatus as recited in claim 24 wherein said sensing means is responsive to the position of one of said vanes for providing a signal representative of the beginning of a cycle.

28. Apparatus as recited in claim 24 wherein said sensing means includes first and second sensors, and said plurality of vanes includes a home position vane and velocity vanes, wherein said first sensor is responsive to said home position vane for determining the beginning of a cutting cycle, and said second sensor is responsive to a dimension of said velocity vanes for providing a signal representative of the velocity of the cycle.

29. Apparatus as recited in claim 28 wherein said sensing means is further responsive to the time interval between the sensing of one of said velocity city vanes and said home position vane for applying a braking voltage to said motor.

30. Apparatus as recited in claim 29 wherein said control means includes manually operable means for altering the time the braking voltage is applied to alter the position of the cutting member at the end of the cutting cycle.

31. Apparatus as recited in claim 29 further including means for indicating a jam if one of said vanes is not sensed within a predetermined time interval following the initiation of the cutting cycle.

32. Apparatus as recited in claim 31 wherein said one of said vanes is the home position vane.

33. Apparatus as recited in claim 1 wherein said rotary member includes a knife blade having a rotary shaft coupled thereto, said apparatus further including a mechanical linkage coupling the drive shaft of said motor to the rotary shaft coupled to said knife blade.

34. Apparatus as recited in claim 33 wherein said linkage includes a first arm coupled to said drive shaft, a second arm coupled to said rotary shaft and means interconnecting said first and second arms.

35. Apparatus as recited in claim 34 wherein said interconnecting means includes a third arm.

36. Apparatus as recited in claim 35 wherein said first arm is shorter than said second arm.

* * * * *